No. 667,537. Patented Feb. 5, 1901.
G. LEES.
SHEET METAL CAN.
(Application filed Jan. 11, 1900. Renewed Aug. 15, 1900.)
(No Model.)
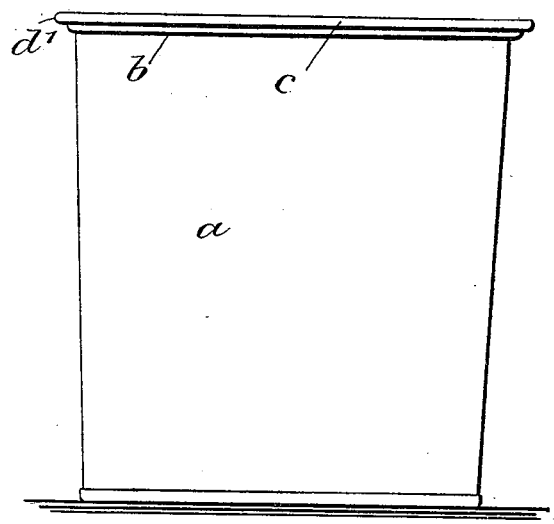
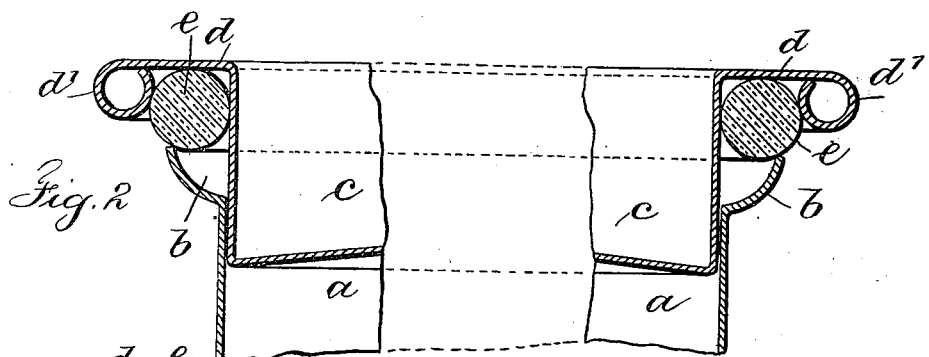
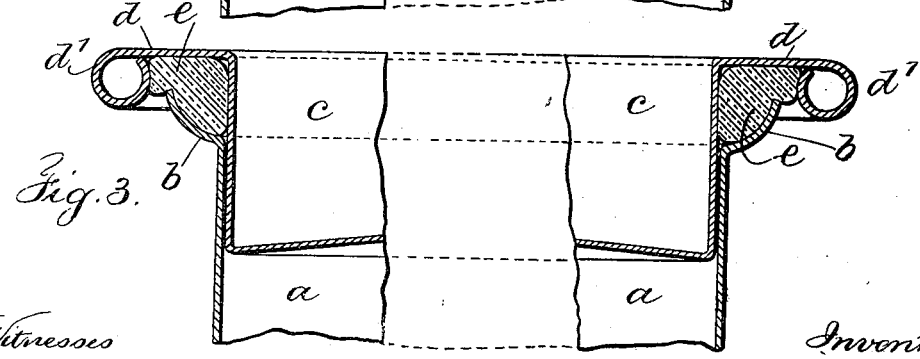
Witnesses
Chas. H. Smith
J. Staib
Inventor
George Lees
per L. W. Serrell & Son
Atty.
THE NORRIS PETERS CO., PHOTO-LITHO., WASHINGTON, D. C.

UNITED STATES PATENT OFFICE.

GEORGE LEES, OF CHICAGO, ILLINOIS, ASSIGNOR TO HIMSELF, AND CHARLES C. HOVEY, OF BAINBRIDGE, NEW YORK.

SHEET-METAL CAN.

SPECIFICATION forming part of Letters Patent No. 667,537, dated February 5, 1901.

Application filed January 11, 1900. Renewed August 15, 1900. Serial No. 26,986. (No model.)

*To all whom it may concern:*

Be it known that I, GEORGE LEES, a citizen of the United States, residing at Chicago, in the county of Cook and State of Illinois, have invented an Improvement in Sheet-Metal Cans, of which the following is a specification.

My invention relates to a sheet-metal can adapted to receive various articles of food and in which such articles of food are preserved by exhausting the air and effecting the seal by atmospheric pressure.

In carrying out my present invention the upper edge of the sheet-metal can-body is made with an outward and upward curved flange, preferably slightly concave in cross-section, and the edge of the sheet-metal cover is bent over and outward into a flat flange with a circular downturned rib formed at the extreme edge and with the diameter of the cover within the said rib slightly greater than the diameter of the body at the flanged upper edge, and between these parts I employ a rubber gasket, which by preference is round in cross-section. When the air is exhausted from the can by suitable means, the atmospheric pressure holds the cover down tightly upon the rubber gasket, forcing the same into the space between the cover and the curved flange of the body and also spreading the gasket over the said flange and into the space formed between the inner adjacent surfaces of the cover and the inner surface of the rib, thus completely and effectually sealing the can.

In the drawings, Figure 1 is an elevation of a sheet-metal can, illustrating my improvement. Fig. 2 is a partial vertical section of the sheet-metal body and cover with the gasket, the parts being in the position before pressure is applied. Fig. 3 is a similar view to Fig. 2 with the parts in the position under pressure. Figs. 2 and 3 are shown of exaggerated size for clearness.

The sheet-metal body $a$ may be of any desired size, shape, or character, and its upper edge is made with an outward and upward curved flange $b$, slightly concave in cross-section, and the edge of the sheet-metal cover $c$ is bent over into a flat flange $d$ and provided with a circular downturned rib $d'$, formed at the extreme edge of the said flange $d$, and the diameter of the cover across the under surface within the rib $d'$ is preferably slightly greater than the diameter across the body and its curved flange, and between these parts I employ a rubber gasket $e$. This may be of any form adapted to effect a seal by atmospheric pressure; but I prefer to employ a gasket that is round in cross-section, as the same more quickly accommodates itself under pressure to the shape of the parts.

Fig. 2 shows the parts in a normal position before pressure is applied, and Fig. 3 shows the same parts with the rubber gasket under pressure, in which position the rubber is forced down into the outward and upward curved flange of the body and between the same and the vertical surface of the cover, and the said gasket also fits against the under surface of the flat flange of the cover and spreads outward against the surface of the downturned rib $d'$ over the upper edge of the body-flange, so that the gasket fits snugly against all of these parts to completely and effectually seal the can.

The devices for exhausting the air from the can and applying atmospheric pressure and devices for unsealing the can form no part of my present invention.

This can is cheaply made and is exceedingly efficient in use, and the same can be used repeatedly without injury.

I claim as my invention—

1. The combination with the sheet-metal body of the can having an outward and upward flange at its upper edge, of a cover fitting within the body of the can and having a flat flange bent outward therefrom and a circular rib at the edge and a rubber gasket between the said parts for completely and effectively sealing the can, substantially as set forth.

2. The combination with the sheet-metal body of a can having a flange at its upper edge formed by bending the same outward and upward and slightly curved, of a sheet-metal cover of slightly-dishing form fitting within the upper end of the body with the edge bent over into a flat flange extending outward and having a circular downturned rib formed at the extreme edge of the cover and a rubber gasket beneath the flat flange of the cover and above the flanged upper edge of the body adapted under pressure to fill the space between the parts and effectively seal the can, substantially as set forth.

3. In a sheet-metal can, comprising a body and cover, an outward and upward curved flange at the upper edge of the body, a flat flange at the edge of the cover and extending out from the main portion thereof and having a downturned rib formed at the extreme edge of the cover, and the diameter of the cover within the said rib greater than the diameter of the body across the flanged edge thereof, and a round rubber gasket between the flange of the body and the cover adapted under pressure to fill the space between the curved flange of the body and the adjacent surface of the cover, to spread over the edge of the body and fill the space beneath the flange of the cover and between the same and the downturned rib to effectually and completely seal the can, substantially as set forth.

Signed by me this 2d day of January, 1900.

GEO. LEES.

Witnesses:
ROLLIN S. STRARY,
WM. BLAKE.